(12) United States Patent
Jeon

(10) Patent No.: US 10,777,022 B2
(45) Date of Patent: Sep. 15, 2020

(54) APPARATUS AND METHOD FOR TRANSFERRING GARMENT DRAPING BETWEEN AVATARS

(71) Applicant: CLO VIRTUAL FASHION INC., Seoul (KR)

(72) Inventor: In Yong Jeon, Seoul (KR)

(73) Assignee: CLO VIRTUAL FASHION INC., Seoul (KR)

(*) Notice: Subject to any disclaimer, the term of this patent is extended or adjusted under 35 U.S.C. 154(b) by 0 days.

(21) Appl. No.: 16/368,892

(22) Filed: Mar. 29, 2019

(65) Prior Publication Data
US 2019/0304200 A1 Oct. 3, 2019

(30) Foreign Application Priority Data
Mar. 30, 2018 (KR) .................. 10-2018-0037752

(51) Int. Cl.
*G06T 19/20* (2011.01)
*G06T 17/20* (2006.01)

(52) U.S. Cl.
CPC ............ *G06T 19/20* (2013.01); *G06T 17/205* (2013.01); *G06T 2210/16* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

2017/0161948 A1* 6/2017 Hua .................. G06T 7/75

FOREIGN PATENT DOCUMENTS

KR 10-2014-0108451 A 9/2014

OTHER PUBLICATIONS

Ju, "Barycentric Coordinates with Applications in Mesh Deformation", posted online @ https://www.cse.wustl.edu/~taoju/research/bary.htm (Year: 2007).*
Robert W. Sumner et al., "Deformation Transfer for Triangle Meshes", SIGGRAPH 2004, ACM Transactions on Graphics. 23, 3, Aug. 2004.

* cited by examiner

*Primary Examiner* — Yingchun He
(74) *Attorney, Agent, or Firm* — Fenwick & West LLP

(57) ABSTRACT

Provided are an apparatus and method for transferring garment draping between avatars. A virtual reference garment, which is modeled with meshes whose plurality of vertices are connected to each other by springs and is designed to closely adhere to a body surface, is prepared. The virtual reference garment is draped on a source avatar. The same virtual reference garment is also draped on a target avatar. As a correspondence map between the avatars, pairs of pieces of position information of meshes of the virtual reference garment draped on the source avatar and corresponding meshes of the virtual reference garment draped on the target avatar are calculated. According to another aspect, deformation transformations between the meshes of the virtual reference garment draped on the source avatar and the corresponding meshes of the virtual reference garment draped on the target avatar are calculated and stored as deformation transformations between the avatars.

6 Claims, 5 Drawing Sheets

APPARATUS AND METHOD FOR TRANSFERRING GARMENT DRAPING BETWEEN AVATARS

CROSS-REFERENCE TO RELATED APPLICATION

This application claims priority to and the benefit of Korean Patent Application No. 10-2018-0037752, filed on Mar. 30, 2018, the disclosure of which is incorporated herein by reference in its entirety.

BACKGROUND

1. Field of the Invention

The present invention relates to a technology for draping a garment on an avatar through computer graphics, and more particularly, to an apparatus and method for transferring garment draping between avatars.

2. Discussion of Related Art

"Deformation transfer for triangle meshes," association for Computing Machinery (ACM) Transactions on Graphics. 23, 3. Aug. 2004 by Robert W. Sumner and Jovan Popovic discloses the basic concept of deformation transfer between graphic objects modeled with triangle meshes. The goal of deformation transfer is to transfer the change in shape exhibited by the source deformation onto the target. The degree of deformation of each mesh of the source object is represented by an affine transformation matrix. The affine transformation matrix encodes the change in orientation, scale, and skew induced by the deformation on the triangle. After this, a correspondence map is calculated by determining meshes of the target corresponding to respective meshes of the source. The correspondence map is generally m:n. Then, a corresponding affine transformation matrix is applied to each mesh of the target. An affine transformation matrix corresponding to each mesh of the target has been calculated from a mesh of the source corresponding to the mesh of the target. Subsequently, to maintain consistency between adjacent meshes, displacements which are optimized to minimize the total sum of energy due to the deformation while maintaining connections between target meshes are calculated for the respective target meshes. When the calculated displacements are each applied to the corresponding target meshes, a three-dimensional (3D) model in which deformation of the source has been transferred to the target is obtained.

Here, the correspondence map is determined by finding triangle meshes whose barycenters are closest to those of source triangle meshes with the help of user-selected marker points. This requires human intervention to calculate target deformation.

Korean Unexamined Patent Publication No. 2014-0108451 filed by the present applicant and published on Sep. 11, 2014 discloses an automatic garment draping transfer method. According to this method, a garment is made like the skin of an avatar, and positions on the surface of the avatar closest to respective points of the garment are calculated so that connections are made between all the points of the garment and points on the surface of the avatar. Subsequently, the sizes and poses of avatars are made identical to each other through fitting between the avatars on the basis of feature points. After this, the garment of the fitted avatar is transferred to the target avatar as it is, and then collisions are removed. When the two avatars considerably differ in shape, many collisions occur, and thus it is difficult to transfer garment draping according to this method. Also, there is no description about automation of the process of mapping corresponding feature points between two avatars.

SUMMARY OF THE INVENTION

The present invention is directed to providing a method of effectively draping a garment, which has been draped on a source avatar, on a target avatar.

The present invention is also directed to making it possible to effectively drape a garment, which has been draped on a source avatar, on a target avatar even when the source avatar and the target avatar considerably differ in shape.

According to an aspect of the present invention, a virtual reference garment modeled with meshes whose plurality of vertices are connected to each other by springs and designed to closely adhere to a body surface is prepared. As a correspondence map between avatars, pairs of pieces of position information of corresponding meshes are calculated from the virtual reference garment draped on a source avatar and the virtual reference garment draped on a target avatar.

According to another aspect of the present invention, deformation transformations between meshes of the virtual reference garment draped on the source avatar and meshes of the virtual reference garment draped on the target avatar are calculated and stored as deformation transformations between the avatars.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The aforementioned and additional aspects of the present invention will become more apparent from embodiments which will be described with reference the accompanying drawings. A variety of combinations of components of the respective embodiments are possible unless described otherwise or contradicted by context.

The present invention is implemented by a graphic program executed in a computing device. The computing device includes a microprocessor and a memory for storing a program executed by the microprocessor and data. As used herein, "command set" may be commands included in one program module of a computer program, consecutive commands in a computer program, or commands which are inconsecutively present at some positions in a computer program but perform one unified function. Operations constituting a method implemented as a computer program may be implemented as one or more command sets.

Figure 1:
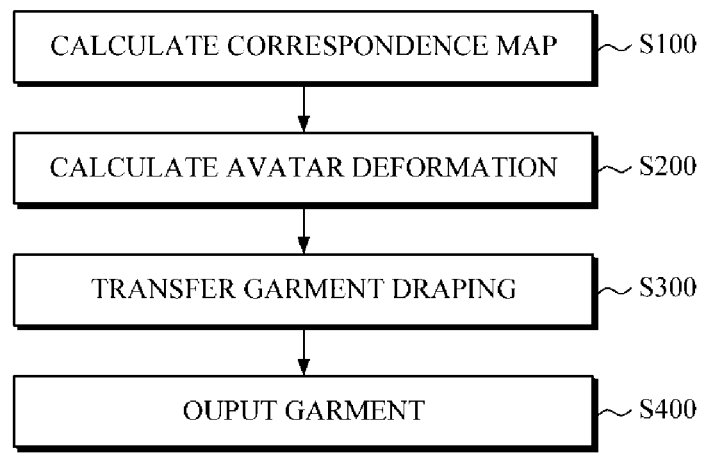
FIG. 1 is a flowchart illustrating a method of transferring garment draping between avatars according to an exemplary embodiment of the present invention.

FIG. 1 is a flowchart illustrating a method of transferring garment draping between avatars according to an exemplary embodiment of the present invention. As shown in the drawing, the method of transferring garment draping between avatars according to an exemplary embodiment includes a correspondence map calculation operation S100, an avatar deformation calculation operation S200, and a garment draping transfer operation S300.

According to an aspect, a virtual reference garment, which is modeled with meshes whose plurality of vertices are connected to each other by springs and is designed to closely adhere to a body surface, is prepared. In an exemplary embodiment, the mesh is a triangle. In general, a virtual garment is modeled with meshes each having a mass and having vertices connected to each other by springs. On the other hand, a virtual reference garment is intended to generally model the surfaces of several avatars having various shapes and thus does not necessarily have a mass. However, it is unnecessary to preclude a mass either.

In a process of draping a garment on an avatar, when a user appropriately disposes two-dimensional (2D) patterns on the avatar and commands that the 2D patterns be sewed along sewing lines, the 2D patterns are converted into a three-dimensional (3D) garment object through simulation. According to an exemplary embodiment of the present invention, after the user appropriately disposes 2D patterns of a virtual reference garment on a source avatar and converts the 2D patterns into a 3D garment object by commanding that sewing lines be sewed, a result, that is, a virtual reference garment draped on the source avatar, is generated. Additionally, after the user appropriately disposes 2D patterns of the same virtual reference garment on a target avatar and converts the 2D patterns into a 3D garment object by commanding that sewing lines be sewed, a result, that is, a virtual reference garment draped on the target avatar, is generated. In the correspondence map calculation operation S100, a correspondence map is calculated from the two virtual reference garments, that is, the virtual reference garment draped on the source avatar and the virtual reference garment draped on the target avatar. The correspondence map includes pairs of pieces of position information of meshes of the virtual reference garment draped on the source avatar and corresponding meshes of the virtual reference garment draped on the target avatar (operation S100). This correspondence map is stored in a memory. As an example, the position information of meshes may be position information of vertices of the meshes. As another example, the position information of meshes may be position information of the barycenters of the meshes. Therefore, even when an avatar surface is not modeled with meshes, for example, even when an avatar is modeled with polygons, it is possible to readily transfer garment draping.

Figure 2:
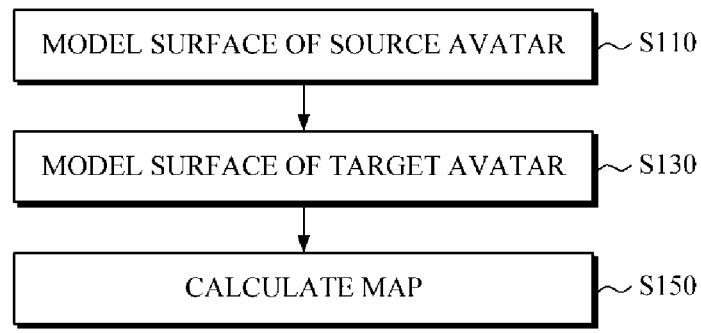
FIG. 2 is a flowchart illustrating a correspondence map calculation operation of FIG. 1 according to an exemplary embodiment of the present invention.

According to another aspect, a correspondence map calculation process including a virtual reference garment draping process is automatically performed. FIG. 2 is a flowchart illustrating a correspondence map calculation operation according to another exemplary embodiment of the present invention. As shown in the drawing, to calculate a correspondence map, a virtual reference garment is draped on a source avatar first (operation S110). When a user selects a source avatar, a program of the present invention recognizes feature points of the source avatar, for example, the head, the shoulder line, the arms, and the legs, through 3D object recognition and appropriately disposes 2D patterns of a virtual reference garment. Sewing line information is previously input into the 2D patterns of the virtual reference garment, and the disposed 2D patterns are connected by the sewing lines and then draped. When the virtual reference garment is draped and meshes of the virtual reference garment closely adhere to a source avatar surface, the source avatar surface is modeled.

The same virtual reference garment is also draped on a target avatar (operation S130). Draping the two avatars may be processed concurrently or in any sequence. When the user selects a target avatar, the program of the present invention recognizes feature points of the target avatar, for example, the head, the shoulder line, the arms, and the legs, through 3D object recognition and appropriately disposes 2D patterns of the virtual reference garment. Sewing line information is previously input into the 2D patterns of the virtual reference garment, and the disposed 2D patterns are connected by the sewing lines and then draped. When the virtual reference garment is draped and meshes of the virtual reference garment closely adhere to a target avatar surface, the target avatar surface is modeled (operation S130).

Therefore, even when an avatar surface is not modeled with meshes, for example, even when an avatar is modeled with polygons, it is possible to readily transfer garment draping.

Subsequently, a correspondence map is calculated from pairs of pieces of position information of meshes of the virtual reference garment draped on the source avatar and corresponding meshes of the virtual reference garment draped on the target avatar (operation S150). Since the same virtual reference garment has been draped, it is possible to directly identify corresponding meshes.

As an example, the position information of meshes may be position information of vertices of the meshes. As another example, the position information of meshes may be position information of the barycenters of the meshes.

Figure 4:
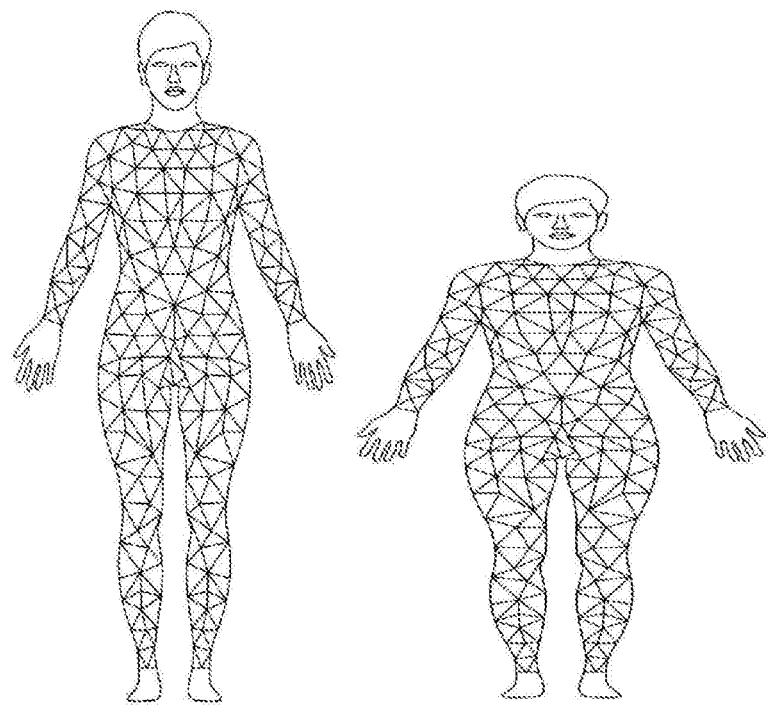
FIG. 4 shows a source avatar and a target avatar draped in a virtual reference garment.

FIG. 4 shows a source avatar and a target avatar draped in a virtual reference garment. Since the same virtual reference garment has been draped, connections and the number of meshes are the same in spite of different volumes and shapes of the two avatars. Meshes are shown for illustration and are not generally shown in actual simulation results.

In general, during a simulation, it is advantageous in terms of calculation reduction to model the sizes of meshes of the virtual garment according to the delicacy of a movement differently depending on parts. In this case, however, meshes are only intended to model an avatar surface, and thus the sizes of all meshes may be identical. The virtual reference garment closely adheres to the surfaces of the source avatar and the target avatar. Therefore, when the virtual reference garment is visualized and output on a screen, the avatars look like they are having their underwear on.

This virtual reference garment is temporarily used to model an avatar surface and covers all avatar surfaces on which garments of various designs may be draped. In other words, the virtual reference garment is required to cover all areas of an avatar surface which may be covered by all kinds of garments, such as a skirt, short pants, pants, a t-shirt, and a dress.

Calculating a correspondence map between avatars with such a virtual reference garment may be extensively applied to animals as well as human bodies. As mentioned above in BACKGROUND, the correspondence map may be applied not only to draping transfer of a garment object but also to deformation transfer.

Next, avatar deformation is calculated (operation S200). The avatar deformation is defined as a deformation transformation between a mesh of the source avatar surface and a mesh of the target avatar surface corresponding to the mesh of the source avatar surface according to the correspondence map. The deformation transformation is frequently expressed as the sum of an affine transformation matrix and a displacement matrix. In another example, when a barycentric coordinate system is appropriately set up and converted, the deformation transformation may be expressed as only an affine transformation matrix. When the surfaces of the avatars are modeled with meshes, it is possible to map meshes of the surface of the source avatar to meshes of the surface of the target avatar using the correspondence map.

According to another aspect, the avatar deformation may be calculated as a deformation transformation between a mesh of the virtual reference garment draped on the source avatar and a corresponding mesh of the virtual reference garment draped on the target avatar. In this case, meshes of the virtual reference garment closely adhering to an avatar surface are considered as modeling the surface of the avatar.

Subsequently, a target garment, which has been draped on the source avatar, is draped on the target avatar using the calculated correspondence map and avatar deformation (operation S300). Meshes of the target garment draped on the source avatar are disposed at corresponding positions of meshes of the target avatar according to the correspondence map, and the avatar deformation is applied so that the target garment may be draped on the target avatar. Various techniques including the technique mentioned in BACKGROUND are known as techniques for deformation transfer between graphic objects based on a correspondence map and deformation transformation.

After this, the target garment draped on the target avatar is output. According to an exemplary embodiment of the present invention, the target garment is rendered to be draped on the target avatar and output on a display. According to another exemplary embodiment of the present invention, the target garment is only stored as graphic object data in an internal memory.

Figure 5:
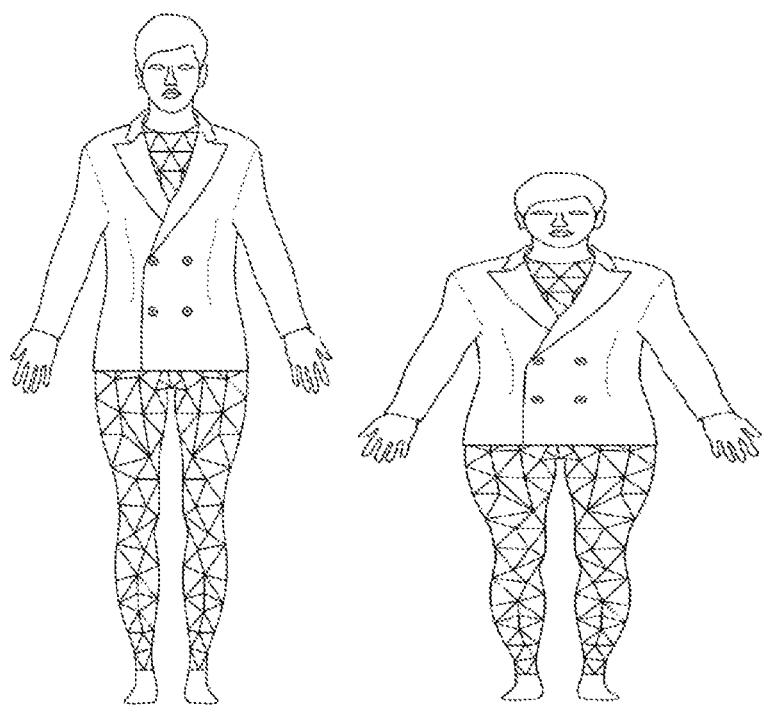
FIG. 5 shows an example of avatars each draped in a source garment and a calculated target garment.

FIG. 5 shows a source garment draped on a source avatar on the left and shows a calculated target garment draped on a target avatar on the right. The present invention may also be applied to a case in which avatars notably differ in shape or have notably different ratios of the arms to the legs or the upper half to the lower half.

Figure 3:
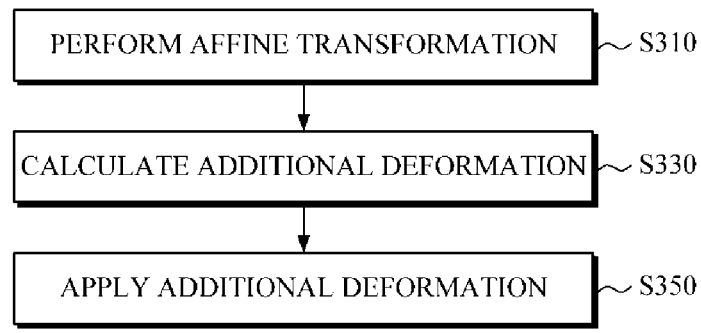
FIG. 3 is a flowchart of a garment draping transfer operation of FIG. 1 according to an exemplary embodiment of the present invention.

FIG. 3 is a flowchart of a garment draping transfer operation of FIG. 1 according to an exemplary embodiment of the present invention. As shown in the drawing, the garment draping transfer operation (S300) according to an exemplary embodiment of the present invention includes an affine transformation operation S310, an additional deformation calculation operation S330, and an additional deformation operation S350. First, in the affine transformation operation, meshes of the target garment draped on the source avatar are disposed at corresponding positions of the target avatar according to the correspondence map, and avatar deformation is applied to each mesh (operation S310). Variations of orientation, scale, and skew caused by mesh deformation are encoded by affine transformation.

Subsequently, in the additional deformation calculation operation, additional deformation distribution is calculated so that the total sum of energy due to additional deformation of respective meshes of the target garment may be minimized while continuity between adjacent meshes of the target garment is maintained (operation S330). The total sum of energy may be represented as, for example, an objective function of adding, to all the vertices of all the meshes disposed in the affine transformation operation S310, the squares of absolute values of differences between the vertices of the meshes and vertices of target meshes deformed while maintaining continuity constraints on the vertices of the meshes. The objective function may be, for example, L2-norm but may be implemented into various examples. According to an exemplary embodiment of the present invention, all additional deformations of the target meshes which make a gradient of the objective function 0 are calculated. The additional deformation values of all the target meshes are stored as additional deformation distribution (operation S330). Since such an optimization process is well known in deformation transfer, detailed description thereof is omitted. Subsequently, additional deformation is applied to each mesh of the target garment according to the calculated additional deformation distribution (operation S350).

As described above, a virtual reference garment may be used to efficiently calculate a correspondence map between two avatars which are totally different in shape.

Also, a virtual reference garment may be used to efficiently calculate a deformation transformation between the surfaces of two avatars which are totally different in shape.

Further, a virtual reference garment may be used to efficiently calculate a deformation transformation between the surfaces of avatars which have not been modeled with meshes.

In this way, garment draping may be efficiently transferred between two avatars which are totally different in shape.

Although exemplary embodiments of the present invention have been described in detail above with reference to the accompanying drawings, the present invention is not limited to the embodiments, and also it should be interpreted that the present invention covers various modifications which may be derived by those of ordinary skill in the art. The claims are intended to encompass all such modifications.

What is claimed is:

1. A method of transferring garment draping between avatars, the method comprising:

preparing a virtual reference garment modeled with meshes having a plurality of vertices connected to each other;

draping the virtual reference garment on a source avatar with meshes of the virtual reference garment adhered to surfaces of the source avatar;

draping the virtual reference garment on a target avatar with the meshes of the virtual reference garment adhered to surfaces of the target avatar;

obtaining a correspondence map indicating correspondence relationships between the meshes of the virtual reference garment draped on the source avatar and the corresponding meshes of the virtual reference garment draped on the target avatar;

determining avatar deformation as deformation transformations between the meshes of the virtual reference garment draped on the source avatar and the corresponding meshes of the virtual reference garment draped on the target avatar as defined by the correspondence map; and transfer-and-draping a target garment distinct from the virtual reference garment onto the target avatar, by applying the avatar deformation to meshes of the target garment draped on the source avatar.

2. The method of claim 1, wherein the transfer-and-draping of the target garment comprises:

performing an affine transformation operation of disposing the meshes of the target garment draped on the source avatar to corresponding positions of the target avatar according to the correspondence map and applying the avatar deformation to each of the meshes of the target garment.

3. The method of claim 1, wherein the avatar deformation comprises deformation information which corresponds barycenter coordinates of the meshes of the virtual reference garment draped on the source avatar with barycenter coordinates of corresponding meshes of the virtual reference garment draped on the target avatar.

4. An apparatus for transferring garment draping between avatars, the apparatus being implemented as a computing device including a microprocessor and a memory for storing a program executed by the microprocessor and data, wherein the program includes:

a correspondence map command set configured to:
   prepare a virtual reference garment modeled with meshes having a plurality of vertices connected to each other,
   drape the virtual reference garment on a source avatar with meshes of the virtual reference garment adhered to surfaces of the source avatar,
   drape the virtual reference garment on a target avatar with the meshes of the virtual reference garment adhered to surfaces of the target avatar, and
   obtain a correspondence map indicating correspondence relationships between the meshes of the virtual reference garment draped on the source avatar and the corresponding meshes of the virtual reference garment draped on the target avatar;

an avatar deformation calculation command set configured to determine avatar deformation as deformation transformations between the meshes of the virtual reference garment draped on the source avatar and the corresponding meshes of the virtual reference garment draped on the target avatar as defined by the correspondence map; and a garment draping transfer command set configured to perform transfer-and-draping a target garment distinct from the virtual reference garment onto the target avatar, by applying the avatar deformation to meshes of the target garment draped on the source avatar.

5. The apparatus of claim 4, wherein the garment draping transfer command set comprises:

an affine transformation command set for disposing the meshes of the target garment draped on the source avatar to corresponding positions of the target avatar according to the correspondence map and applying the avatar deformation to each of the meshes of the target garment.

6. The apparatus of claim 4, wherein the avatar deformation comprises deformation information which corresponds barycenter coordinates of the meshes of the virtual reference garment draped on the source avatar with barycenter coordinates of corresponding meshes of the virtual reference garment draped on the target avatar.

* * * * *